United States Patent [19]
Baltus et al.

[11] Patent Number: 4,783,047
[45] Date of Patent: Nov. 8, 1988

[54] VALVE MECHANISM

[75] Inventors: George T. Baltus; Raymond Warmuz, both of Tonawanda, N.Y.

[73] Assignee: HSC Controls, Inc., Buffalo, N.Y.

[21] Appl. No.: 12,505

[22] Filed: Feb. 9, 1987

[51] Int. Cl.⁴ .............................................. F16R 31/06
[52] U.S. Cl. ............................ 251/129.1; 251/129.2; 251/356; 29/157.1 R; 29/157 R
[58] Field of Search ............. 29/157.1 R, 157 R; 137/625.64, 82, 625.61; 251/129.2, 129.1, 356

[56] References Cited

U.S. PATENT DOCUMENTS

| | | | |
|---|---|---|---|
| 1,856,138 | 5/1932 | Ruemelin | |
| 1,950,120 | 3/1934 | McKee | 50/26 |
| 1,991,052 | 2/1935 | Derby | 251/154 |
| 2,479,688 | 8/1949 | Lindgren | 251/46 |
| 2,720,212 | 10/1955 | Kimm et al. | 137/81 |
| 2,788,570 | 4/1957 | Hoeh | 29/157.1 |
| 3,026,082 | 3/1962 | Essig | 251/14 |
| 3,101,739 | 8/1963 | Pribonic | 137/529 |
| 3,326,513 | 6/1967 | Hall | 251/86 |
| 3,373,769 | 3/1968 | Chaves, Jr. et al. | 137/595 |
| 3,510,100 | 5/1970 | Makusay et al. | 251/138 |
| 4,134,572 | 1/1979 | Schmidt | 29/157 R |
| 4,170,339 | 10/1979 | Veda et al. | 251/129.2 |

Primary Examiner—Arnold Rosenthal
Attorney, Agent, or Firm—Bean, Kauffman & Bean

[57] ABSTRACT

A valve features a valve member adjustably fixed to a mounting member during assembly of the valve to provide for accurate repetitive seating of the valve member in fluid sealing engagement with a valve seat.

7 Claims, 1 Drawing Sheet

VALVE MECHANISM

BACKGROUND OF THE INVENTION

The present invention relates to valves and more particularly to poppet valves of the type operated by an electromagnetic force motor for purposes of effecting a zero leak seal when in closed condition.

Valves of the type described are employed for instance in aerospace applications to control the flow of fuel and/or oxidizer. Initially, attempts were made to create a zero leak seal by carefully machining mating sealing surfaces and providing for precise mounting of a poppet and valve seat during assembly thereof, but seals of this type are extremely difficult to fabricate. One example of this type of valve appears to be U.S. Pat. No. 3,373,769.

It has also been proposed to avoid the necessity of providing for accurate mounting of a poppet and valve seat during initial assembly of a valve by loosely mounting a poppet within a recess defined by a flapper, so as to permit the poppet to rotatably/tiltably position itself with respect to both the flapper and the valve seat each time the valve is closed, as required to provide a desired fluid seal. A drawback of this construction is that movements of the poppet relative to the flapper tend to occur whenever the valve is open and exposed to vibration and acceleration conditions. As a result, when the valve is subsequently closed, frictional effects between the poppet and the flapper and/or valve seat produces a hysteresis characteristic for the valve, which is not acceptable for many aerospace applications. A second drawback of this type of valve is that any movement of the poppet relative to the flapper while the valve is in open condition, also changes the orientation of the poppet relative to the valve seat and results in variations in flow through the valve. As a result, this type of valve is only adapted to provide for either full closed or full open flow conditions and cannot be employed to effect accurately controlled incremental variations or adjustments in fluid flow rate. One example of a valve appearing to have these characteristics is that disclosed in U.S. Pat. No. 3,510,100.

Although not directed to the type of valve herein contemplated, it has also been proposed to employ a low melting point adhesive, such as solder, to adhere a cap to a valve member or disc, as an incident to assembly of a valve in order to provide for proper positioning of the cap relative to a valve seat, as evidenced by U.S. Pat. No. 2,788,570.

SUMMARY OF THE INVENTION

The present invention relates to an improved valve construction adapted to provide for zero fluid leakage, as well as to permit operation of the valve in a manner providing for accurately controlled incremental adjustments in flow rate.

More particularly, a preferred form of the present invention is directed towards an electromagnetic motor operated poppet valve having a novel structure providing for adjustably positioning a poppet relative to a flapper, as an incident to the fabrication of the valve, which allows for subsequent maintenance of the poppet in a fixed position relative to the flapper.

The present valve features a poppet having a head portion defining a sealing surface and a bearing surface converging in a direction away from the sealing surface and towards an axis disposed to essentially centrally intersect with the sealing surface, and a shank portion arranged in alignment with the axis and to project from the bearing surface in a direction away from the sealing surface; a valve seat having a sealing surface adapted to receive the poppet sealing surface in a fluid sealing relationship; a flapper operably connected to an electromagnetic force motor for moving the poppet to position the poppet sealing surface in and out of sealing relationship with the seat sealing surface, wherein the flapper is formed with an opening sized to loosely receive the shank portion and an annular bearing edge portion bounding such opening and engageable with the poppet bearing surface to permit the poppet to undergo rotatable/tilting movement relative to the flapper in order to assume an adjusted position relative thereto during initial assembly of the valve as required to permit seating of the sealing surfaces in sealing engagement; and retaining means operable after initial assembly of the valve for thereafter retaining the poppet in adjusted position relative to the flapper.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
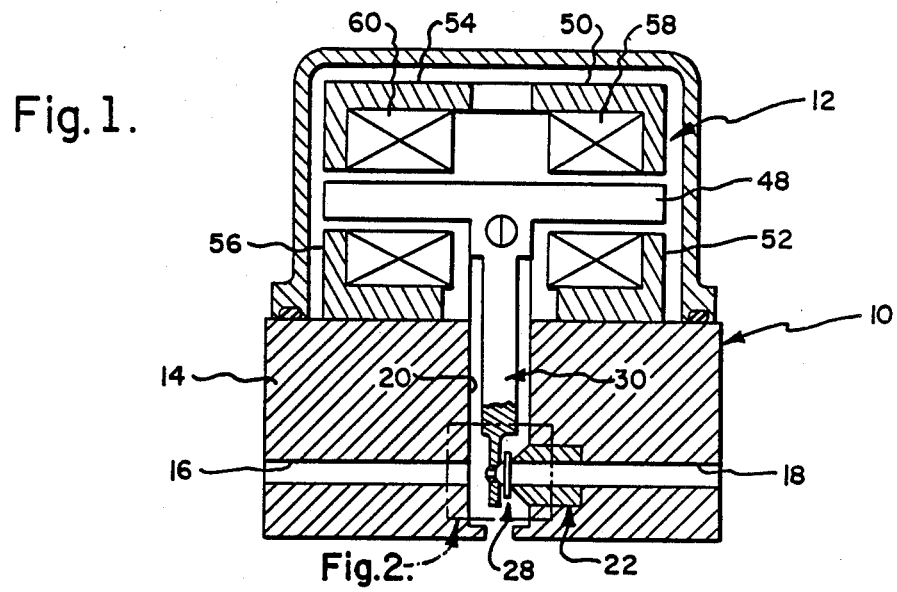
FIG. 1 is a sectional view of a valve embodying the present invention.

A valve assembly formed in accordance with a preferred form of the present invention is generally designated as 10 and shown for example in FIG. 1 in association with an electromagnetic force motor 12.

Assembly 10 generally includes a valve body 14 defining an inlet opening 16, an outlet opening 18 and a recess 20 communicating with the inlet and outlet openings; a valve seat 22 serving to define a discharge passage 24 communicating at its opposite ends with the outlet opening and recess, and a seat sealing surface 26 bounding the discharge passage adjacent the recess; a valve member or poppet 28; and a mounting member, such as may be defined by a pivotally supported flapper 30 adapted for mounting the poppet for movement into and out of fluid sealing engagement with the valve seat under the control of motor 12. If required, the positions of the inlet and outlet openings of valve body 14 may be reversed from that shown in the drawings.

Figure 2:
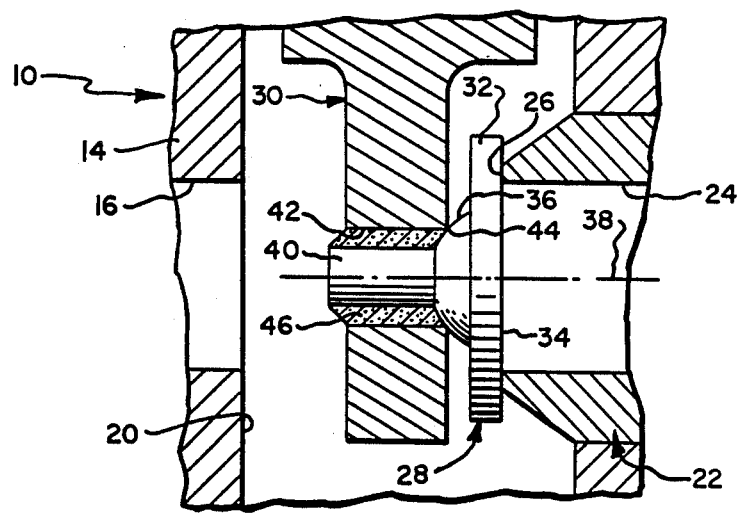
FIG. 2 is an enlarged view of the encircled area designated as FIG. 2 in FIG. 1.
Figure 3:
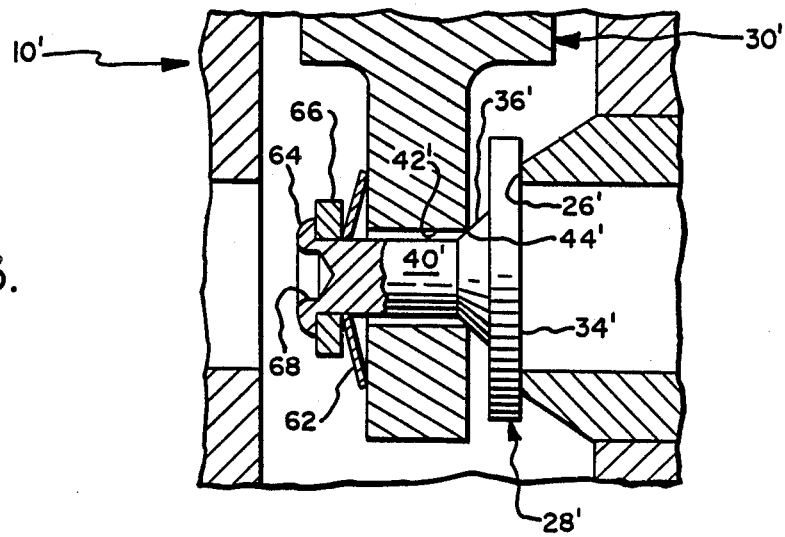
FIG. 3 is a view similar to FIG. 2, but showing an alternative form of the present invention.

Poppet 28 is best shown in FIG. 2 as having an enlarged head portion 32 serving to define an essentially planar, poppet sealing surface 34 and an oppositely facing bearing surface 36, which converges in a direction away from the poppet sealing surface and towards an axis 38 disposed normal to and so as to essentially centrally intersect with the poppet sealing surface; and a shank or stem portion 40 arranged in alignment with the axis and to project from the bearing surface in a direction away from the poppet sealing surface. Poppet bearing surface 36 may be for example of essentially hemispherical configuration, as shown in FIG. 2, or of essentially conical configuration, as shown in FIG. 3 in connection with an alternative form of the present invention.

Flapper 30 is best shown in FIG. 2 as being formed with a mounting opening 42, which faces towards valve seat 22 and is sized to loosely receive shank portion 40; and an annular bearing edge surface 44 arranged to bound the mounting opening relatively adjacent the valve seat. Mounting opening 42 may be defined by a through bore opening, as shown in FIG. 2, or a blind bore opening, as desired, so long as shank portion 40 is free to move sufficiently to allow poppet 28 to undergo rotatable/tilting movement relative to flapper 30, as required to permit poppet sealing surface 34 to be placed in desired fluid sealing engagement with seat sealing surface 26, during initial assembly of valve assembly 10 in the manner to be described. Thereafter, poppet 28 is intended to be fixed against movement relative to flapper 30, during subsequent operation of valve assembly 10, by an adhesive composition 46 arranged to fill mounting opening 42 outwardly of shank portion 40. Preferably, adhesive composition 46 is a thermosetting plastic composition, such as epoxy, which is relatively viscous in its uncured state.

Motor 12 is shown generally in FIG. 1 as being of conventional construction in that it includes an armature 48 to which flapper 30 is suitably attached; suitably polarized pole pieces 50, 52, 54 and 56, which are positioned on opposite sides of the armature; and coils 58 and 60 arranged to encircle the armature. Coils 58 and 60 are supplied with electrical signals for purposes of causing armature 48 to move and in turn effect movement of flapper 30 in order to operate valve assembly 10. A more complete description of the construction and mode of operation of motor 12 may be had by making reference for example to U.S. Pat. Nos. 3,373,769 and 3,510,100, whose disclosures are incorporated by reference herein.

In accordance with the preferred form of the present invention, poppet 28 is initially adjustably positioned and thereafter permanently fixed against further movement relative to flapper 30, so as to insure desired fluid sealing engagement between sealing surfaces 26 and 34 whenever valve assembly 10 is in closed condition. The invention also allows for the uniform relative positioning of sealing surfaces 26 and 34 during all stages of movement of poppet 28 relative to valve seat 22, so as to provide for accurate control of fluid flowing into and through passage 24, as determined by control signals applied to coils 58 and 60. More specifically, valve assembly 10 is assembled by inserting shank portion 40 of poppet 28 into mounting opening 42 so as to arrange poppet bearing surface 36 for engagement with bearing edge 44 and poppet sealing surface 34 for engagement with seat sealing surface 26 with adhesive 46 in uncured form having been previously inserted into the mounting opening or applied to the shank portion in an amount sufficient to essentially fully fill the void therebetween. Thereafter, flapper 30 is displaced by applying a suitable valve closing signal to motor 12 or by mechanical means for purposes of placing poppet sealing surface 34 in fluid sealing engagement with seat sealing surface 26 and poppet bearing surface 36 in fully seated bearing engagement with bearing edge 44 incident to which poppet 28 is normally caused to undergo at least some degree of rotational and/or tilting movement relative to the flapper until it is seated in an adjusted position relative thereto. Poppet 28 is then permanently fixed against movement relative to flapper 30 by curing adhesive 46 before releasing sealing surfaces 26 and 34 from fluid sealing engagement. Curing of adhesive 46 may be carried out for instance by placing the whole of valve assembly 10 in a heated oven or by applying heat directly to shank portion 40 and/or to that portion of flapper 30 immediately adjacent thereto.

An alternative form of the present invention is shown in FIG. 3, wherein like parts are designated by like primed numerals. Valve assembly 10' differs from assembly 10 in that poppet 28' is biased to assume its adjusted position relative to flapper 30' by a belleville spring 62, which is arranged to surround shank portion 40' and have one surface thereof bear against the flapper peripherally of an end of mounting opening 42' opposite from that bounded by bearing edge 44'. A preload is applied to spring 62 by flaring or riveting the free end of shank portion 40' outwardly, as at 64, to engage a retaining washer 66, which is in turn arranged to surround the shank portion and bear on an opposite or outwardly facing surface of the spring. Controlled deformation of shank portion 40' may be facilitated by providing its free end with a blind bore opening 68.

Assembly 10' is assembled by first inserting stem portion 40' within mounting opening 42', so as to arrange poppet bearing surface 36' for engagement with bearing edge 44' and to arrange poppet sealing surface 34' for engagement with seat sealing surface 26'. Thereafter, flapper 30' would be displaced by operation of its associated motor or by mechanical means for purposes of placing poppet sealing surface 34' in fluid sealing engagement with seat sealing surface 26' and poppet bearing surface 36' in fully seated bearing engagement with bearing edge 44' incident to which poppet 28' is normally caused to move until placed in an adjusted position relative to the flapper. Then, before flapper 30' is freed for movement into a valve open condition, belleville spring 62 and washer 66 are applied to shank portion 40' and the free end of the latter flared outwardly whereby to maintain the flapper and poppet in assembled condition and to subject spring 62 to a preload, which is sufficient to prevent displacement of the poppet from its adjusted position, as an incident to loading conditions expected to be encountered during a subsequent operational life of valve assembly 10'.

While the invention has been disclosed for use in a valve body of single nozzle design, it will be understood that the invention is also adapted for use in valve bodies having plural nozzles or flow paths extending therethrough. It will also be understood that while in the preferred form of the invention a thermal setting adhesive is employed to fix a poppet relative to its supporting flapper, it is contemplated that other types of adhesive, as well as other bonding procedures, such as welding, may also be employed.

What is claimed is:

1. In an electromagnetic force motor operated valve for controlling the flow of fluid, the improvement comprising:

a valve member having a head portion defining a sealing surface and a bearing surface converging in a direction away from said sealing surface and towards an axis disposed to essentially centrally intersect with said sealing surface, and a shank portion arranged in alignment with said axis and projecting from said bearing surface in a direction away from said sealing surface;

a valve seat adapted to receive said sealing surface in fluid sealing relationship therewith;

a mounting member for mounting said valve member and being operably connected to said force motor for moving said valve member to position said sealing surface in and out of said sealing relationship, said mounting member having an opening facing towards said valve seat and sized to loosely receive said shank portion and an annular bearing edge portion bounding said opening relatively adjacent said valve seat, said bearing edge portion defining a seat for supporting said bearing surface to permit said valve member to undergo rotatable/tilting movement relative to said mounting member and to assume an adjusted position relative thereto, during initial assembly of said valve, as required to permit seating of said sealing surface in said sealing relationship with said valve seat incident to movement of said valve member towards said valve seat by said mounting member; and retaining means operable after said initial assembly for thereafter retaining said valve member in said adjusted position relative to said mounting member.

2. An improvement according to claim 1, wherein said retaining means is a material filling said opening in said mounting member outwardly of said shank portion, said material having a first condition permitting movement of said valve member relative to said mounting member and a second condition initiated after said valve member is in said adjusted position for fixing said valve member in said adjusted position.

3. An improvement according to claim 2, wherein said material is a heat curable adhesive.

4. An improvement according to claim 1, wherein said mounting member is a flapper, said valve member is a poppet, said opening extends through said flapper, and said retaining means includes a belleville spring surrounding said shank and having one surface arranged in engagement with said flapper peripherally of an opposite end of said opening, a retaining washer surrounding said shank and engaging an opposite surface of said belleville spring, and a free end of said shank portion is flared outwardly to engage said retaining washer and effect preloading of said belleville spring.

5. A method of assembling an electromagnetic force operated poppet valve having a poppet formed with a sealing surface, a stationary valve seat and a flapper for supporting said poppet to move said sealing surface into and out of fluid sealing engagement with said valve seat, said method comprising:

providing said poppet with a bearing surface converging in a direction away from said sealing surface and towards an axis intersecting said sealing surface essentially centrally thereof and at an essentially right angular relationship therewith and a shank portion arranged in alignment with said axis and projecting from said bearing surface in a direction away from said sealing surface;

providing said flapper with an opening bounded by a bearing edge facing generally towards said valve seat, said opening being sized to loosely receive said shank portion when said bearing surface is arranged in engagement with said bearing edge;

inserting said shank portion within said opening to arrange said bearing surface for engagement with said bearing edge and said sealing surface for engagement with said valve seat;

moving said flapper to place said sealing surface in sealing engagement with said valve seat and to place said bearing surface in bearing engagement with said bearing edge; and fixing said poppet against movement relative to said flapper before releasing said sealing surface from sealing engagement with said valve seat to thereafter maintain said bearing surface in a permanently adjusted position relative to said bearing edge during subsequent movements of said flapper.

6. A method according to claim 5, wherein the step of fixing said poppet to said flapper includes heat setting an adhesive composition placed in said opening for bonding said shank portion to said flapper.

7. A method according to claim 5, wherein the step of fixing said poppet to said flapper includes providing a spring preloaded to maintain said bearing surface in said permanently adjusted position.

* * * * *